United States Patent Office 3,666,510
Patented May 30, 1972

---

3,666,510
LUBRICATED THERMOPLASTIC RESIN COMPOSITIONS
Antony W. M. Coaker, St. Louis, and Richard C. Gross, Creve Coeur, Mo., assignors to Monsanto Company, St. Louis, Mo.
No Drawing. Filed Dec. 13, 1967, Ser. No. 690,088
Int. Cl. C08f 45/38
U.S. Cl. 106—181
17 Claims

ABSTRACT OF THE DISCLOSURE

This invention relates to improved thermoplastic resin compositions which contain a long chain alkenyl substituted succinic anhydride or an ester thereof as a lubricant.

---

This invention relates to new and improved thermoplastic resin compositions having excellent physical properties such as fusion, workability, stability, flow and heat distortion temperature. More particularly, this invention is concerned with novel, easily processable compositions comprising a thermoplastic resin and a minor proportion of an alkenyl succinic anhydride or ester thereof.

It is well known that polyvinyl aromatic compounds are characterized by improved properties of toughness when a small amount of a rubbery polymer is added thereto. In order to mold such thermoplastic materials, it is necessary to employ agents which improve moldability, such as lubricants.

Vinyl chloride polymers are generally hard, rigid, chemically resistant thermoplastic materials and, consequently, are widely used in various applications such as chemical processing equipment, pipes, sheeting, moldings, building panels and the like. A major disadvantage of this material is its poor impact resistance. Incorporation of relatively large amounts of plasticizers or other compounding ingredients to improve the physical properties and processing characteristics of vinyl chloride resins, has not resulted in a product which is suitable for use where a relatively high impact strength is required. Additionally, vinyl chloride resins are often difficult to process since the resins tend to degrade before reaching the melt viscosity necessary to assure good melt flow characteristics.

Nylon is a well-known substance and may be readily prepared by polycondensation of dicarboxylic acids and diamines or by polycondensation of amino acids to provide high molecular weight polymers. Particularly desirable nylon is prepared by the polycondensation of hexamethylene diamine and adipic acid or by the polycondensation of 6-aminocaproic acid. It is also well known that commercially prepared nylon is difficult to handle in friction producing operations. In order to provide nylon possessing high lubricity and low-friction characteristics, it is necessary to incorporate a lubricating agent into the polymeric material.

Polycarbonate resins have found many useful applications in the plastics industry because their physical properties, coupled with chemical properties, are comparable to those of polystyrene, polymethacrylate and cellulose esters. The polycarbonate resins are widely employed to fabricate hard, rigid and solid articles such as cam bearings, switches, levers, hardware, pipes, fittings, valves, etc. The industrial use of these resins is considerably restricted, however, since the resins are fabricated only with great difficulty. More workable and useful polycarbonate resin compositions having improved lubricity charactertistics are provided by addition of a lubricating agent with the polycarbonate resin.

Accordingly, it is a principal ooject of this invention to provide an additive for thermoplastic resin compositions which provides the desired processing and lubricating properties.

Other objects and advantages of the invention will be apparent to those skilled in the art from the following detailed description and claims.

In accordance with this invention, it has been found that the above and still further objects are accomplished by incorporating a thermoplastic resin and a minor quantity of an alkenyl succinic anhydride, or the monoesters and diesters thereof, wherein the alkenyl radical has a molecular weight ranging from about 400 to about 3000, and more preferably, from about 700 to about 1500.

Vinyl aromatic resins suitable for use in the present invention are homopolymers and copolymers of monovinyl-substituted aromatic hydrocarbon compounds having the vinyl group attached to a carbon atom of the aromatic nucleus substituted with one or more groups such as methyl, ethyl and chloro groups. The preferred polyvinyl aromatic resins utilize styrene as the vinyl aromatic constituent. In addition, the monovinyl-substituted aromatic constituent may also be admixed or interpolymerized with from about 1 to about 250 parts by weight, per 100 parts by weight of monovinyl-substituted aromatic constituent, of a synthetic rubber such as polybutadiene, polyisoprene, copolymers of butadiene and styrene and copolymers of butadiene and acrylonitrile which improved the properties of toughness. The preferred polymers suitable for this invention include styrene, butadiene, and acrylonitrile components such as the copolymer of styrene with butadiene, and the terpolymer of styrene, acrylonitrile and butadiene. Illustrative examples of substances that can be copolymerized with the monovinyl-substituted aromatic hydrocarbon to form a copolymer are one or more other ethylenically unsaturated compounds such as ethylene, propylene, isobutylene, butadiene, isoprene, chloroprene, vinyl halides such as vinyl chloride, vinyl esters such as vinyl acetate and vinyl butyrate, acrylic and alpha-substituted arcylic acids and the esters, nitriles and amides thereof such as methyl acrylate, ethyl acrylate, acrylonitrile, acrylamide, methyl methacrylate, butyl methacrylate, methyl phenacrylate, methacrylonitrile, methacrylamide and alpha-beta-ethylenically unsaturated dicarboxylic acids and anhydrides and the esters and amides and nitriles thereof such as maleic acid, maleic anhydride, fumaric acid, fumaronitrile, divinyl benzene and the like.

The "vinyl halide polymers" of this invention are homopolymers of vinyl compounds such as vinyl chloride, vinyl bromide, vinyl fluoride and vinyl iodide as well as copolymers of such vinyl compounds with one or more other ethylenically unsaturated monomers copolymerizable therewith. Illustrative are the copolymers of vinyl halide monomers with one or more other monomers such as ethylene, propylene, isobutylene, butadiene and the like; vinyl esters of carboxylic acids, e.g., vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compounds, e.g., styrene, ortho-chlorostyrene, para-chlorostyrene; dienes such as butadiene and cholorobutadiene; unsaturated amides such as acrylic acid amide and acrylic acid anilide; unsaturated nitriles such as acrylic acid nitrile; esters of alpha-beta-unsaturated carboxylic acids, e.g., the methyl, ethyl, propyl, butyl, amyl, hexyl, heptyl, octyl, allyl and phenyl esters of maleic, crotonic, itaconic and fumaric acids and the like; vinyl halides such as vinylidene bromide, vinylidene chloride and the like. Those copolymers in which a predominant portion, i.e., more than 50% by weight of the copolymer, is made from vinyl chloride represent a preferred class of polymers to be treated according to this invention. Included within the meaning of the phrase "vinyl halide polymers" are graft copolymers of vinyl halides on backbones of rubbery materials such as chlorinated polyethylene as well as polyblends of vinyl halides with rubbery interpolymers such as a styrene-butadiene interpolymer or butadiene-acrylonitrile interpolymer.

The term "polycarbonate resin," as used herein, is meant to designate thermoplastic resins of linear aliphatic, cycloaliphatic and aromatic polyesters of carbonic acid. These thermoplastic polycarbonates may be produced from a great number of aliphatic, cycloaliphatic and aromatic dihydroxy compounds.

Illustrative of the aliphatic dihydroxy compounds which can be employed are ethylene glycol, diethylene glycol, triethylene glycol, polyethylene glycol, thioglycol, ethylene dithioglycol, 1,3-propanediol, 1,3-butanediol, 1,4-butanediol, 1,3-(2-methyl)propanediol, 1,5-pentanediol, 1,6-hexanediol, 1,8-octanediol, 1,10-decanediol. Illustrative of cycloaliphatic dihydroxy compounds are 1,4-cyclohexanediol, 1,2-cyclohexanediol, 2,2-(4,4'-dihydroxydicyclohexylene)propane and 2,6 - dihydroxydecahydronaphthalene. Illustrative of the aromatic dihydroxy compounds are hydroquinone, resorcinol, pyrocatechol, 4,4'-dihydroxydiphenyl, 1,6-dihydroxynaphthalene, 2,6-dihydroxynaphthalene, 1,4 - dihydroxynaphthalene, 1,5 - dihydroxynaphthalene, dihydroxyanthracene, 2,2'-dihydroxydinaphthyl-1,1' and o,m,p-hydroxybenzyl alcohol and the like; di - (monohydroxyaryl)sulfones such as di(4 - hydroxyphenyl)sulfone, di(2-hydroxyphenyl)sulfone, di-(3-hydroxyphenyl)sulfone, di-(4 - hydroxy-2-methylphenyl)-sulfone, di-(4-hydroxy-3-methylphenyl)sulfone, di-(2-hydroxy-4-methylphenyl)sulfone, di-(4-hydroxy - 2 - ethylphenyl)sulfone, di-(4-hydroxy-3-ethylphenyl)sulfone, di-(4-hydroxy-2-tert.-butylphenyl)sulfone, di - (4-hydroxy-3-tert.-butylphenyl)sulfone, di - (2-hydroxy-1-naphthyl)sulfone and the like;

di-(monohydroxyaryl)alkanes such as
1,1-di(4-hydroxyphenyl)ethane,
1,1-di(4-hydroxyphenyl)propane,
1,1-di(4-hydroxyphenyl)butane,
1,1-di(4-hydroxyphenyl)-2-methyl-propane,
1,1-di(4-hydroxyphenyl)heptane,
1,1-di(4-hydroxyphenyl)-1-phenylmethane,
di-(4-hydroxyphenyl)-4-methylphenyl-methane,
di-(4-hydroxyphenyl)-4-ethylphenyl-methane,
di-(4-hydroxyphenyl)-4-isopropylphenyl-methane,
di-(4-hydroxyphenyl)-4-butylphenyl-methane,
di-(4-hydroxyphenyl)benzylmethane,
di-(4-hydroxyphenyl)-α-furylmethane,
2,2-di(4-hydroxyphenyl)octane,
2,2-di(4-hydroxyphenyl)nonane,
di-(4-hydroxyphenyl)-1-α-furyl-ethane,
1,1-di(4-hydroxyphenyl)cyclopentane,
2,2-di(4-hydroxyphenyl)decahydronaphthalene,
2,2-di(4-hydroxy-3-cyclohexylphenyl)propane,
2,2-di(4-hydroxy-3-isopropylphenyl)butane,
1,1-di(4-hydroxy-3-methylphenyl)cyclohexane,
2,2-di(4-hydroxy-3-butylphenyl)propane,
2,2-di(4-hydroxy-3-phenylphenyl)propane,
2,2-di(4-hydroxy-2-methylphenyl)propane,
1,1-di(4-hydroxy-3-methyl-6-butylphenyl)butane,
1,1-di(4-hydroxy-3-methyl-6-tert.-butylphenyl)ethane,
1,1di(4-hydroxy-3-methyl-6-tert.-butylphenyl)propane,
1,1-di(4-hydroxy-3-methyl-6-tert.-butylphenyl)butane,
1,1-di(4-hydroxy-3-methyl-6-tert.-butylphenyl)isobutane,
1,1-di(4-hydroxy-3-methyl-6-tert.-butylphenyl)heptane,
1,1-di(4-hydroxy-3-methyl-6-tert-butylphenyl)-1-phenyl-methane,
1,1-di(4-hydroxy-3-methyl-6-tert.-butylphenyl)-2-methyl-2-pentane,
1,1-di(4-hydroxy-3-methyl-6-tert.-butylphenyl)-2-ethyl-2-hexane,
1,1-di(4-hydroxy-3-methyl-6-tert.-amylphenyl)butane,
di-(4-hydroxyphenyl)methane,
2,2-di(4-hydroxyphenyl)propane,
1,1-di(4-hydroxyphenyl)cyclohexane,
1,1-di(4-hydroxy-3-methylphenyl)cyclohexane,
1,1-di(2-hydroxy-4-methylphenyl)butane,
2,2-di(2-hydroxy-4-tert.-butylphenyl)propane,
1,1-di(4-hydroxyphenyl)-1-phenylethane,
2,2-di(4-hydroxyphenyl)butane,
2,2-di(4-hydroxyphenyl)pentane,
3,3-di(4-hydroxyphenyl)pentane,
2,2-di(4-hydroxyphenyl)hexane,
3,3-di(4-hydroxyphenyl)hexane,
2,2-di(4-hydroxyphenyl)-4-methylpentane,
2,2-di(4-hydroxyphenyl)heptane,
4,4-di(4-hydroxyphenyl)heptane,
2,2-di(4-hydroxyphenyl)tridecane,
2,2-di(4-hydroxy-3-methylphenyl)propane,
2,2-di(4-hydroxy-3-methyl-3'-isopropylphenyl)butane,
2,2-di(3,5-dichloro-4-hydroxyphenyl)propane,
2,2-di(3,5-dibromo-4-hydroxyphenyl)propane,
di-(3-chloro-4-hydroxyphenyl)methane,
di-(2-hydroxy-5-fluorophenyl)methane,
di-(4-hydroxyphenyl)phenylmethane,
1,1-di(4-hydroxyphenyl)-1-phenylethane, and the like.

The preferred class of dihydroxy compounds for use in the practice of this invention are the aromatic dihydroxy compounds and in particular the di-(monohydroxyaryl)alkanes.

Polycarbonates of the aforesaid di-(monohydroxyaryl)alkanes can be prepared by a number of methods known to those skilled in the art. For example, the di-(monohydroxyaryl)alkanes can be re-esterified with carbonic acid diesters, e.g., dimethyl-, diethyl-, dipropyl-, dibutyl-, diamyl-, dioctyl-, dicyclohexyl-, diphenyl-, and di-o,p-tolyl-carbonate and the like, at elevated temperatures from about 50° C. to about 320° C.

Another method available for the preparation of polycarbonates involves the introduction of phosgene into solutions of di-(monohydroxyaryl)alkanes in organic bases, such as dimethylaniline, diethylaniline, trimethylaniline, pyridine and the like or into solutions of di-(monohydroxyaryl)alkanes in different organic solvents such as ligroin, cyclohexane, methylcyclohexane, benzene, toluene, xylene, chloroform, methylene chloride, carbon tetrachloride, trichloroethylene, dichloroethane, methyl acetate, ethyl acetate and the like, with the addition of an acid-binding agent, e.g., a tertiary amine.

Still another suitable process for producing polycarbonates comprises introducing phosgene into the aqueous solution or suspension of alkali metal salts such as lithium, sodium, potassium, and calcium salts of the di-(monohydroxyaryl)alkanes, preferably in the presence of an excess of a base such as lithium, sodium, potassium, and calcium hydroxide or carbonate. The polycarbonates precipitate from the aqueous solution.

The di-(monohydroxyaryl)alkanes can be reacted with bischloro-carbonates of di-(monohydroxyaryl)alkanes in the presence of inert solvents and acid-binding materials, e.g., tertiary amines.

Additional examples of thermoplastic materials suitable for use with this invention include polyvinyl acetate, cellulose ethers such as ethyl cellulose, cellulose esters of organic acids having 2 to 4 carbon atoms such as cellulose acetate, cellulose propionate, cellulose butyrate, cellulose acetate-butyrate and cellulose acetate-propionate and polymers of α-monoolefins having 2 to 24 carbon atoms such as the polymers and copolymers of ethylene, propylene, 1-butene, 1-octene, 1-dodecene, 3-methyl-1-pentene, 3-methyl-4-ethyl-1-hexene, 3-methyl-1-butene, 1-hexene, 5-methyl-1-hexene, 3,4-dimethyl-1-pentene, 3,3-dimethyl-1-butene, 1-pentene, 3-methyl-1-hexene, 1-decene and the like. Also suitable for use with this invention are polymers of methyl methacrylate, which can be either homopolymers of methyl methacrylate or copolymers of methyl methacrylate with one or more other ethylenically unsaturated monomers copolymerizable therewith, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, butadiene, various amides and styrene. Those copolymers containing more than 75% of methyl methacrylate monomer units are preferred for use with this invention.

The processing and lubrication aids utilized in the thermoplastic compositions of the present invention are long chain alkenyl succinic anhydrides, and the monoesters and diesters thereof, wherein the alkenyl radical has a molecular weight from about 400 to about 3000 or, in other words, the alkenyl radical contains from about 30 to about 200 carbon atoms. The use of compounds in which the alkenyl radical has a molecular weight ranging from about 700 to about 1500, i.e., the alkenyl radical contains from about 50 to about 100 carbon atoms, as lubricants is preferred.

The alkenyl succinic anhydrides which are useful as lubricants with this invention have the general formula,

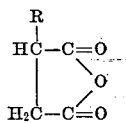

wherein R is a straight or branched chain alkenyl radical containing from about 30 to about 200 carbon atoms. These alkenyl-substituted succinic anhydrides are readily prepared by reacting a high molecular weight olefin with maleic anhydride at a temperature of about 150 to 250° C. in molar ratios of from about 1:1 to about 1:5, respectively. The alkenyl radical is derived from a polyolefin containing from about 30 to about 200 carbon atoms which is obtained by polymerizing an olefin having from 2 to about 30 carbon atoms. Examples of suitable olefins include ethene, propene, 1-butene, 2-butene, isobutene, 1-pentene, 1-hexene, 2-hexene, 1-octene, 4-octene, the nonenes, 1-decene, 1-tetradecene, 1-octadecene and the like.

The monoesters and diesters of the above-described alkenyl succinic anhydrides which are also useful in accordance with the invention have the general formula,

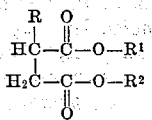

wherein:
R is an alkenyl radical containing from about 30 to about 200 carbon atoms,
$R^1$ is selected from the group consisting of hydrogen, alkyl having 1 to 20 carbon atoms, cycloalkyl having 4 to 18 carbon atoms, aralkyl having 7 to 11 carbon atoms, aryl having 6 to 10 carbon atoms and alkoxyalkyl having up to 8 carbon atoms, and
$R^2$ is selected from the group consisting of alkyl having 1 to 20 carbon atoms, cycloalkyl having 4 to 18 carbon atoms, aralkyl having 7 to 11 carbon atoms, aryl having 6 to 10 carbon atoms and alkoxyalkyl having up to 8 carbon atoms.

The alkyl and cycloalkyl radicals can be derived from many sources. For example, the alkyl radicals can be straight or branched chain radicals having up to 20 carbon atoms derived from various sources such as alcohols, including alcohols produced by the oxo synthesis or alcohols obtained by catalytic hydrogenation of coconut oil, from oxidized waxes or from esterification of a carbonyl group by reaction with an olefin. Illustrative examples of alkyl radicals are methyl, ethyl, propyl, isopropyl, n-butyl, isobutyl, sec.-butyl, tert.-butyl, n-amyl, isoamyl, n-hexyl, isohexyl, 2-ethylheptyl, 2-ethylhexyl, octyl, isooctyl, 2-octyl, isononyl, decyl, lauryl, tetradecyl, pentadecyl, octadecyl, allyl, crotyl, oleyl, alkyl radicals derived from $C_3$ to $C_{20}$ oxo alcohols, etc. Illustrative examples of cycloalkyl radicals are cyclobutyl, cyclopentyl, 2-methylcyclopentyl, 3 - methylcyclopentyl, 2,4 - dimethylcyclopentyl, cyclohexyl, 3,5-dimethylcyclohexyl, gem.-dimethylcyclohexylmethyl, cyclohexylpropyl, methylcyclohexylethyl, 2-propylcyclohexyl, 3-dodecylcyclohexyl, cycloheptyl, 2,4-dimethylcycloheptyl, 2,3,5-trimethylcycloheptyl, etc. Illustrative examples of aryl radicals are phenyl, nephthyl, etc. Illustrative examples of aralkyl radicals ars benzyl, 4-methylbenzyl, 3-phenylpropyl, phenethyl, etc. Illustrative examples of alkoxyalkyl radicals are ethoxyethyl, butoxyethyl, methoxypropyl, butoxybutyl and the like.

The monoesters and diesters of the present invention are readily prepared by various means known to the art; for example, they may be prepared by reacting an alkenyl succinic anhydride and an alcohol in the presence of an esterification catalyst. The mixed esters may be produced by esterifying an alkenyl succinic anhydride to the monoester stage with one alcohol and thereafter reacting the monoester with another alcohol.

The polymeric compositions of the present invention comprise a blend of a major proportion of a thermoplastic resin and a minor proportion of a long chain alkenyl succinic anhydride or ester thereof. More particularly, the compositions comprise a blend of from about 0.001 to 5.0 parts by weight of alkenyl succinic anhydride or ester thereof for each 100 parts by weight of thermoplastic resin. A preferred composition of this invention is one wherein the quantity of lubricating agent ranges from about 0.05 to about 3.0 parts by weight per 100 parts by weight of thermoplastic resin. Incorporation of an amount of lubricating agent in excess of 5.0 parts by weight per 100 parts by weight of thermoplastic resin employed is not useful with the present invention since the system is overlubricated.

The polymer blends of the invention are readily prepared by mechanical methods. The thermoplastic resin and the long chain alkenyl succinic anhydride or esters thereof are intimately admixed together on a conventional mixing machine of the type normally used for mixing rubber or plastics such as a mill roll, an extruder or a Banbury mixer. Preferably, the thermoplastic resin is first placed on the mill roll and after a small rolling bank has formed in the nip of the rolls, the lubricating agent is added. The thermoplastic resin and the lubricating agent, each in disintegrated or divided form, can also be mixed together to form a crude admixture which is then placed on the mill roll. Regardless of the method by which the mixing of these materials is achieved, it is necessary that the materials be mixed together or worked under a sufficient heat and pressure to insure an efficient dispersion of the lubricating agent in the thermoplastic resin so as to form a completely homogeneous material. The temperature at which this working or mastication is carried out is not critical as long as the temperature is at least above the temperature where the thermoplastic resin fuses and below the temperature where decomposition occurs.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

In the following examples, in which parts are given by weight unless otherwise stated, the apparent viscosities of the thermoplastic resinous compositions of the present invention are evaluated according to A.S.T.M. Test No. D1703–62 on an Instron Rheometer at a temperature of 190° C. using a Length to Radius ratio of 66.32, a shear rate of 67.4 sec.$^{-1}$ and a die having a ninety degree entry angle. Samples used in determining apparent viscosities are fluxed on a two roll mill and ground into pellets prior to measurement on the rheometer.

EXAMPLES 1-10

Polyvinyl chloride compositions containing varying proportions of the lubricant of the present invention are prepared by mechanically milling the various admixtures, together with desired processing aids, stabilizers and the like, on a 6" x 12" Thropp mill rolls at a temperature of from about 170° to 210° C. A rough mix is first prepared from the preformed polymers in powdered or pelleted form in a stainless steel beaker. The rough mix is placed on the heated mill rolls and thoroughly homogenized by intensive hot milling for 5 minutes or until an adequate dispersion is obtained. The compositions are then sheeted and stripped from the mill rolls. After sufficient cooling, the sheets are cut into 1 to 2 inch squares for convenient feeding to an Abbe grinder for grinding into pellet size. The apparent viscosities of the blends are measured on an Instron Rheometer in accordance with the procedure described above and are reported in Table I.

(j) Phenethyl diester of polytridecene substituted succinic anhydride wherein the polytridecenyl radical has an average molecular weight of 1460.

(k) Phenyl diester of polytetradecene substituted succinic anhydride wherein the polytetradecenyl radical has an average molecular weight of 825.

(l) Methoxypropyl diester of polypentadecene substituted succinic anhydride wherein the polypentadecenyl radical has an average molecular weight of 1080.

(m) Octadecyl cyclopentyl diester of polyhexadecene substituted succinic anhydride wherein the polyhexadecenyl radical has an average molecular weight of 1240.

(n) Ethyl benzyl diester of polyheptadecene substituted succinic anhydride wherein the polyheptadecenyl radical has an average molecular weight of 2760.

(o) Nonyl phenyl polyoctadecene substituted succinic anhydride wherein the polyoctadecenyl radical has an average molecular weight of 1590.

(p) Isooctyl butoxyethyl diester of polynonadecene substituted succinic anhydride wherein the polynonadecenyl radical has an average molecular weight of 2120.

TABLE I

| Composition | Parts by weight | | | | | | | | | |
|---|---|---|---|---|---|---|---|---|---|---|
| | 1 | 2 | 3 | 4 | 5 | 6 | 7 | 8 | 9 | 10 |
| Polyvinyl chloride | 100 | 100 | 100 | 100 | 100 | 100 | 100 | 100 | 100 | 100 |
| EVCl [1] impact modifier | 10 | 10 | 10 | | | | | | | |
| Polyacrylic processing aid | 1 | 1 | 1 | | | 1 | 1 | 1 | 1 | 1 |
| Epoxidized soybean oil | 1 | 1 | 1 | | | | | | | |
| Barium-cadmium stabilizer | 2.5 | 2.5 | 2.5 | | | 3 | 3 | | | |
| Phosphite stabilizer | 0.5 | 0.5 | 0.5 | | | | | | | |
| ABS [2] impact modifier | | | | | | 10 | 10 | | | |
| MBS [3] impact modifier | | | | 10 | 10 | | | | | |
| Organotin stabilizer | | | | 2 | 2 | | | 3 | 3 | 3 |
| Lubricant [5] | | 1 | 2 | 1 | | 1 | | | | |
| Lubricant [6] | | | | | | | | | 0.25 | 3 |
| Apparent viscosity ×10$^4$ poises | 5.54 | 2.02 | 1.61 | 6.18 | 5.31 | 5.81 | 5.31 | 4.99 | 4.68 | 1.09 |

[1] Ethylene-vinyl chloride copolymer.
[2] Acrylonitrile-butadiene-styrene terpolymer.
[3] Methacrylate-butadiene-styrene terpolymer.
[5] Isobutyl diester of polybutene substituted succinic anhydride wherein the polybutenyl radical has an average molecular weight of 1,350.
[6] Isodecyl diester of polybutene substituted succinic anhydride wherein the polybutenyl radical has an average molecular weight of 1,350.

Results similar to those obtained with the compositions employed in Examples 1-10 of Table I are obtained when the following lubricants are used in place of the isobutyl diester of polybutene substituted succinic anhydride wherein the polybutenyl radical has an average molecular weight of 1350 of these compositions.

(a) Polypropene substituted succinic anhydride wherein the polypropenyl radical has an average molecular weight of 450.

(b) Polyisobutene substituted succinic anhydride wherein the polyisobutenyl radical has an average molecular weight of 2500.

(c) Methyl monoester of polypentene substituted succinic anhydride wherein the polypentenyl radical has an average molecular weight of 750.

(d) Cyclohexyl monoester of polyhexene substituted succinic anhydride wherein the polyhexenyl radical has an average molecular weight of 1900.

(e) Benzyl monoester of polyoctene substituted succinic anhydride wherein the polyoctenyl radical has an average molecular weight 2950.

(f) Phenyl monoester of polynonene substituted succinic anhydride wherein the polynonenyl radical has an average molecular weight of 1150.

(g) Ethoxyethyl monoester of polydecene substituted succinic anhydride wherein the polydecenyl radical has an average molecular weight of 600.

(h) Tetradecyl diester of polyethene substituted succinic anhydride wherein the polyethenyl radical has an average molecular weight of 2375.

(i) Cyclobutyl diester of polydodecene substituted succinic anhydride wherein the polydodecenyl radical has an average molecular weight of 520.

(q) Cycloheptyl phenethyl diester of polydocosene substituted succinic anhydride wherein the polydocosenyl radical has an average molecular weight of 1830.

(r) Cyclobutyl phenyl diester of polytricosene substituted succinic anhydride wherein the polytricosenyl radical has an average molecular weight of 2420.

(s) Cyclohexyl butoxybutyl diester of polyisononene substituted succinic anhydride wherein the polyisononenyl radical has an average molecular weight of 2880.

(t) Benzyl ethoxyethyl diester of polyisohexene substituted succinic anhydride wherein the polyisohexenyl radical has an average molecular weight of 820.

(u) Phenyl benzyl diester of polybutene substituted succinic anhydride wherein the polybutenyl radical has an average molecular weight of 440.

(v) Phenyl methoxypropyl diester of polybutene substituted succinic anhydride wherein the polybutenyl radical has an average molecular weight of 2050.

It is found that similar effective apparent viscosity results are also obtained when the polyvinyl chloride in the foregoing examples is replaced by an equivalent amount of a copolymer of 95 parts of vinyl chloride and 5 parts of vinyl acetate, a copolymer of 90 parts of vinyl chloride and 10 parts of vinylidene chloride, a copolymer of 70 parts of vinyl chloride and 30 parts of diethylmaleate, etc.

EXAMPLES 11-30

Following the procedure of Example 1, the resinous compositions shown in Tables II and III are prepared. The apparent viscosities of these compositions are measured and given in the following tables:

TABLE II

| Composition | Parts by weight | | | | | | | | | |
|---|---|---|---|---|---|---|---|---|---|---|
| | 11 | 12 | 13 | 14 | 15 | 16 | 17 [7] | 18 [7] | 19 | 20 |
| Graft copolymer of 96 parts of polyvinyl chloride on 4 parts of chlorinated polyethylene | 100 | 100 | 100 | 100 | | | | | | |
| Copolymer of 92 parts of vinyl chloride and 8 parts of vinyl acetate | | | | | 100 | 100 | | | | |
| Cellulose acetate | | | | | | | 100 | 100 | | |
| Polymethyl methacrylate | | | | | | | | | 100 | 100 |
| Polyacrylic processing aid | 1 | 1 | 1 | 1 | | | | | | |
| Epoxidized soybean oil | 1 | 1 | 1 | 1 | | | | | | |
| Barium-cadmium stabilizer | 2.5 | 2.5 | 2.5 | 2.5 | | | | | | |
| Phosphite stabilizer | 0.5 | 0.5 | 0.5 | 0.5 | | | | | | |
| Organotin stabilizer | | | | | 3 | 3 | | | | |
| Methyl-N-ethylsulfonamide | | | | | | | 15 | 15 | | |
| Phenolic stabilizer | | | | | | | 0.5 | 0.5 | | |
| Lubricant A [1] | 1.5 | | | | | | | | | 1.5 |
| Lubricant B [2] | | 1.5 | | | | | | | | |
| Lubricant C [3] | | | 1.5 | | | | | | | |
| Lubricant D [5] | | | | 1.5 | | | 1.5 | | | |
| Lubricant E [6] | | | | | 1 | | | | | |
| Apparent viscosity×10^4 poises | 6.53 | 3.84 | 4.26 | 3.74 | 0.89 | 0.84 | 1.63 | 0.96 | 4.82 | 3.42 |

[1] Isobutyl diester of polybutene substituted succinic anhydride wherein the polybutenyl radical has an average molecular weight of 900.
[2] Isobutyl diester of polybutene substituted succinic anhydride wherein the polybutenyl radical has an average molecular weight of 1,350.
[3] Isodecyl diester of polybutene substituted succinic anhydride wherein the polybutenyl radical has an average molecular weight of 900.
[5] Isohexyl diester of polybutene substituted succinic anhydride wherein the polybutenyl radical has an average molecular weight of 1,350.
[6] Isohexyl diester of polybutene substituted succinic anhydride wherein the polybutenyl radical has an average molecular weight of 900.
[7] Apparent viscosity is determined as described earlier with the exception that the Instron Rheometer is maintained at 210° C.

TABLE III

| Composition | Parts by weight | | | | | | | | | |
|---|---|---|---|---|---|---|---|---|---|---|
| | 21 | 22 | 23 | 24 | 25 | 26 | 27 | 28 | 29 | 30 |
| Polystyrene | 100 | 100 | 100 | | | | | | 50 | 50 |
| ABS [1] terpolymer | | | | 100 | 100 | | | | | |
| Polyethylene | | | | | | 100 | 100 | 100 | | |
| Copolymer of 10 parts of butadiene and 90 parts of styrene | | | | | | | | | 50 | 50 |
| Phenolic stabilizer | | | | | | 0.05 | 0.05 | 0.05 | | |
| Lubricant A [2] | | 0.5 | | | | | | | | |
| Lubricant B [3] | | | 0.5 | | 1.5 | | | | | |
| Lubricant C [5] | | | | | | | 2 | 4 | | |
| Lubricant D [6] | | | | | | | | | | 3 |
| Apparent viscosity×10^4 poises | 0.87 | 0.72 | 0.80 | 3.49 | 3.28 | 1.49 | 1.34 | 1.23 | 1.94 | 1.82 |

[1] Terpolymer of 25 parts of acrylonitrile, 20 parts of butadiene and 55 parts of styrene.
[2] Isobutyl diester of polybutene substituted succinic anhydride wherein the polybutenyl radical has an average molecular weight of 900.
[3] Polybutene substituted succinic anhydride wherein the polybutenyl radical has an average molecular weight of 1,350.
[5] Isodecyl diester of polybutene substituted succinic anhydride wherein the polybutenyl radical has an average molecular weight of 1,350.
[6] Isobutyl diester of polybutene substituted succinic anhydride wherein the polybutenyl radical has an average molecular weight of 1,350.

EXAMPLES 31–51

The thermoplastic resins listed below in each example are mixed on a rolling mill to a homogeneous blend with 2 parts by weight, per 100 parts by weight of each thermoplastic resin, of isobutyl diester of polybutene substituted succinic anhydride wherein the polybutenyl radical has an average molecular weight of 900.

| Example | Thermoplastic resins |
|---|---|
| 31 | A polycarbonate of 1,1-di(4-hydroxyphenyl)propane. |
| 32 | A polycarbonate of 2,2-di(4-hydroxyphenyl)propane. |
| 33 | A polycarbonate of 1,1-di(4-hydroxyphenyl)cyclohexane. |
| 34 | Polyvinyl acetate. |
| 35 | Ethyl cellulose. |
| 36 | Cellulose propionate. |
| 37 | Cellulose acetate-butyrate. |
| 38 | Polypropylene. |
| 39 | Polyhexamethylene adipamide. |
| 40 | A copolymer of 4 parts of ethylene and 96 parts of vinyl chloride. |
| 41 | A copolymer of 60 parts of styrene and 40 parts of methyl methacrylate. |
| 42 | A copolymer of 30 parts of styrene and 70 parts of acrylonitrile. |
| 43 | Polycaprolactam. |
| 44 | A copolymer of 98 parts of methyl methacrylate and 2 parts of methacrylic acid. |
| 45 | A copolymer of 80 parts of methyl methacrylate and 20 parts of glycidyl methacrylate. |
| 46 | A terpolymer of 85 parts of methyl methacrylate, 11 parts of acrylonitrile and 4 parts of acrylic acid. |
| 47 | A terpolymer of 50 parts of styrene, 35 parts of acrylonitrile and 15 parts of acrylic acid. |
| 48 | A terpolymer of 60 parts of vinyl chloride, 20 parts of acrylonitrile and 20 parts of acrylic acid. |
| 49 | Poly (α-methylstyrene). |
| 50 | Poly-4-methylpentene-1. |
| 51 | Polyoctadecene-1. |

The resultant thermoplastic resinous compositions have apparent viscosities which are lower than those of compositions obtained from the thermoplastic resins in the absence of the lubricant additive.

From the foregoing results it is evident that the relative viscosity or melt flow property of the compositions of this invention is notably superior to that of the unblended thermoplastic resinous compositions. In addition, it is found that other desired physical characteristics of the compositions of the present invention such as hardness, impact strengths and heat distortion temperatures, are not unduly affected by the incorporation of the lubricant additives employed in the compositions of this invention. Furthermore, it has also been found that these compositions easily release from molds when molded and the processing temperatures of these compositions are remarkably lowered.

For many purposes it may be desirable to blend other conventional additives with the thermoplastic resinous compositions of the present invention. For example, the properties of the resinous compositions may be modified by incorporating therewith an inert filler such as glass fibers, ground asbestos, mica and the like, dyes, pigments, plasticizers, reinforcing materials, stabilizers and the like. It will be apparent that compositions containing such other additives are within the scope of this invention. The compositions may readily be calendered to form smooth sheets and fabricated into shaped articles by conventional forming techniques, for example, by blow molding, injection molding, casting and extrusion.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed as defined as follows:

1. A composition of matter comprising a thermoplastic resin and a substituted succinic compound selected from the group consisting of substituted succinic anhydrides having the general formula,

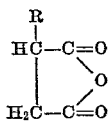

where R is a straight or branched chain alkenyl radical having from about 30 to about 200 carbon atoms, and esters of substituted succinic anhydrides having the general formula,

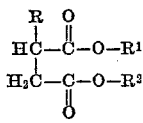

where R is a straight or branched chain alkenyl group having from about 30 to about 200 carbon atoms, $R^1$ is a radical selected from the group consisting of hydrogen, alkyl having 1 to 20 carbon atoms, cycloalkyl having 4 to 18 carbon atoms, aralkyl having 7 to 11 carbon atoms, aryl having 6 to 10 carbon atoms and alkoxyalkyl having up to 8 carbon atoms, and $R^2$ is a radical selected from the group consisting of alkyl having 1 to 20 carbon atoms, cycloalkyl having 4 to 18 carbon atoms, aralkyl having 7 to 11 carbon atoms, aryl having 6 to 10 carbon atoms and alkoxyalkyl having up to 8 carbon atoms, wherein said substituted succinic compound is present in amounts of from about 0.001 to 5.0 parts by weight per 100 parts by weight of thermoplastic resin.

2. A composition as defined in claim 1 wherein the substituted succinic compound is a compound selected from the group consisting of substituted succinic anhydrides having the general formula,

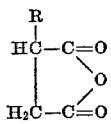

where R is a straight or branched chain alkenyl radical having from about 50 to about 100 carbon atoms, and esters of substituted succinic anhydrides having the general formula,

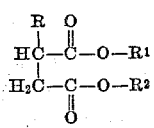

where R is a straight or branched chain alkenyl group having from about 50 to about 100 carbon atoms, $R^1$ is a radical selected from the group consisting of hydrogen, alkyl having 1 to 20 carbon atoms, cycloalkyl having 4 to 18 carbon atoms, aralkyl having 7 to 11 carbon atoms, aryl having 6 to 10 carbon atoms and alkoxyalkyl having up to 8 carbon atoms, and $R^2$ is a radical selected from the group consisting of alkyl having 1 to 20 carbon atoms, cycloalkyl having 4 to 18 carbon atoms, aralkyl having 7 to 11 carbon atoms, aryl having 6 to 10 carbon atoms and alkoxyalkyl having up to 8 carbon atoms.

3. A composition as defined in claim 1 wherein the substituted succinic compound is present in amounts of from about 0.05 to about 3.0 parts by weight per 100 parts by weight of the thermoplastic resin.

4. A composition as defined in claim 1 wherein the thermoplastic resin is a vinyl halide polymer selected from the group consisting of polymerized vinyl halide monomers and copolymers of such monomers with at least one dissimilar ethylenically unsaturated monomer.

5. A composition as defined in claim 1 wherein the thermoplastic resin is a cellulose ester of an oragnic acid having 2 to 4 carbon atoms.

6. A composition as defined in claim 1 wherein the thermoplastic resin is a polymer of methyl methacrylate selected from the group consisting of homopolymers of methyl methacrylate and copolymers of methyl methacrylate with at least one dissimilar ethylenically unsaturated monomer.

7. A composition as defined in claim 1 wherein the thermoplastic resin is a polymer of an α-monoolefin having 2 to 24 carbon atoms.

8. A composition as defined in claim 1 wherein the thermoplastic resin is a monovinyl-substituted aromatic hydrocarbon polymer selected from the group consisting of polymerized monovinyl-substituted aromatic hydrocarbon monomers and copolymers of such monomers with at least one dissimilar ethylenically unsaturated monomer.

9. A composition as defined in claim 1 wherein the thermoplastic resin is a composition comprising a synthetic rubber and a monovinyl-substituted aromatic hydrocarbon polymer selected from the group consisting of polymerized monovinyl-substituted aromatic hydrocarbon monomers and copolymers of such monomers with at least one dissimilar ethylenically unsaturated monomer, wherein said synthetic rubber is present in amounts of from about 1 to about 250 parts by weight per 100 parts by weight of said monovinyl-substituted aromatic hydrocarbon polymer.

10. A composition as defined in claim 1 wherein the thermoplastic resin is a polycarbonate resin.

11. A composition as defined in claim 1 wherein the substituted succinic compound is isobutyl diester of polybutene substituted succinic anhydride wherein the polybutenyl radical has an average molecular weight of 900.

12. A composition as defined in claim 1 wherein the substituted succinic compound is isobutyl diester of polybutene substituted succinic anhydride wherein the polybutenyl radical has an average molecular weight of 1350.

13. A composition as defined in claim 1 wherein the substituted succinic compound is isodecyl diester of polybutene substituted succinic anhydride wherein the polybutenyl radical has an average molecular weight of 900.

14. A composition as defined in claim 1 wherein the substituted succinic compound is polybutene substituted succinic anhydride wherein the polybutenyl radical has an average molecular weight of 1350.

15. A composition as defined in claim 1 wherein the substituted succinic compound is isohexyl diester of polybutene substituted succinic anhydride wherein the polybutenyl radical has an average molecular weight of 900.

16. A composition as defined in claim 1 wherein the substituted succinic compound is isohexyl diester of polybutene substituted succinic anhydride wherein the polybutenyl radical has an average molecular weight of 1350.

17. A composition as defined in claim 1 wherein the substituted succinic compound is isodecyl diester of polybutene substituted succinic anhydride wherein the polybutenyl radical has an average molecular weight of 1350.

(References on following page)

References Cited

UNITED STATES PATENTS

| | | | |
|---|---|---|---|
| 2,182,361 | 12/1939 | Smith | 260—31.8 I |
| 2,644,761 | 7/1953 | McGirr | 106—181 |
| 2,689,799 | 9/1954 | Albus et al. | 106—181 |
| 2,913,482 | 11/1959 | Dazzi | 252—56 D |
| 3,288,714 | 11/1966 | Osuch | 252—56 D |
| 3,331,776 | 7/1967 | Krukziener | 252—56 D |
| 3,381,022 | 4/1968 | Le Suer | 252—56 D |
| 2,999,868 | 9/1961 | Phillips et al. | 260—348 |

MORRIS LIEBMAN, Primary Examiner

S. M. PERSON, Assistant Examiner

U.S. Cl. X.R.

260—31.8 R, 31.8 N, 31.8 DR, 31.8 PQ, 31.8 AN